April 16, 1946.  W. A. BAILEY, JR., ET AL  2,398,610
STABILIZED ALUMINA AND PREPARATION THEREOF
Filed May 23, 1944
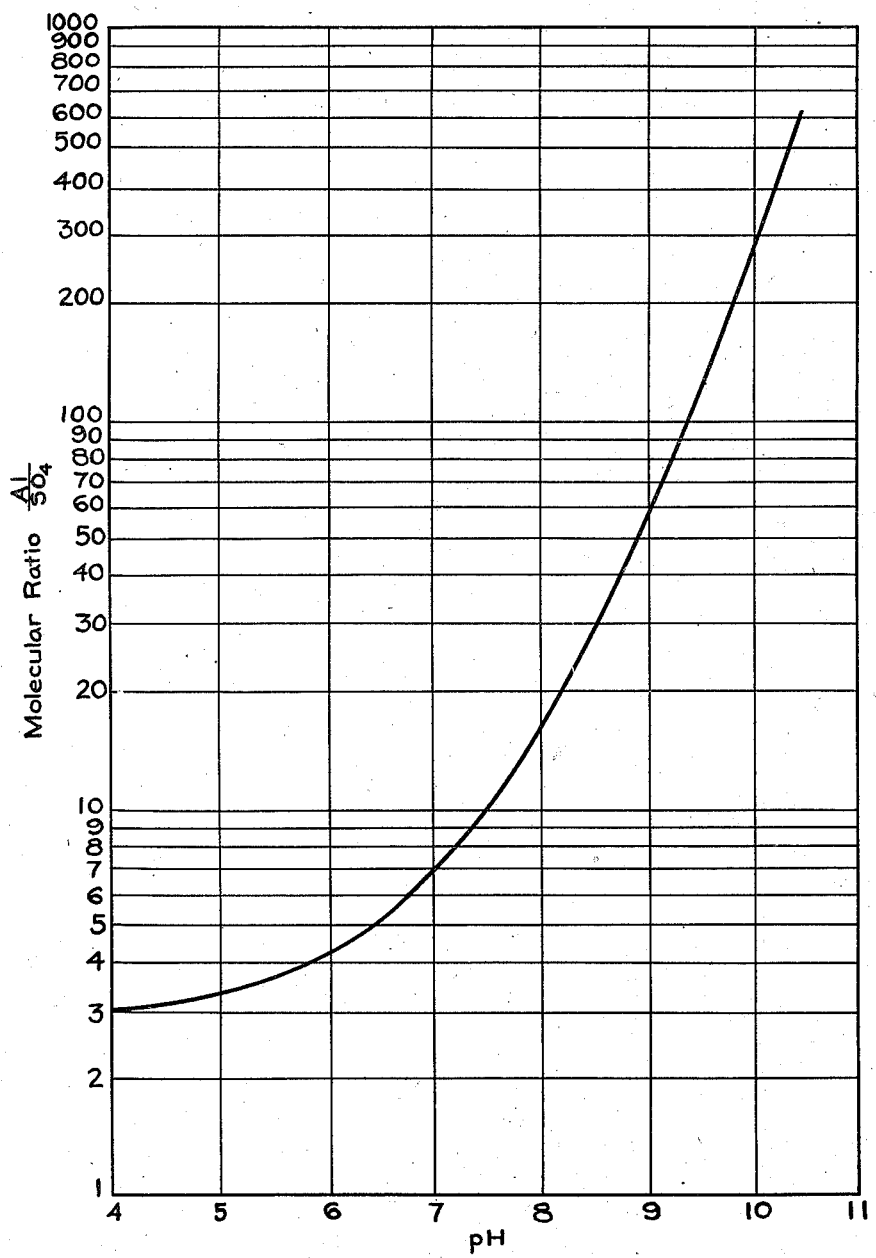
Inventors: William A. Bailey Jr.
Clarence W. Bittner
By their Attorney: C. J. Ott Patented Apr. 16, 1946

2,398,610

UNITED STATES PATENT OFFICE 2,398,610

STABILIZED ALUMINA AND PREPARATION THEREOF

William A. Bailey, Jr., Oakland, and Clarence W. Bittner, Berkeley, Calif., assignors to Shell Development Company, San Francisco, Calif., a corporation of Delaware Application May 23, 1944, Serial No. 536,976

14 Claims. (Cl. 252—254)

This invention relates to the preparation of new and improved stabilized aluminas which are particularly suitable for use in catalysis.

Adsorptive alumina is used as a catalyst for effecting a considerable variety of reactions, such, for example, as dehydration, oxidation, dehydrogenation, isomerization, condensation, and cracking. Adsorptive alumina is also a particularly excellent carrier for a large number and variety of other catalytic agents. Consequently, adsorptive alumina has a very wide application in catalysis.

In many of the uses to which adsorptive alumina is put, it is subjected to relatively high temperatures, or to the action of superheated steam, or both. These tend to impair the efficiency or activity of the alumina. These conditions may be encountered in the actual processing step or in a subsequent regeneration or reactivation step, or in both steps. The efficiency or activity of the alumina when impaired by such causes is permanent, i. e., it cannot be brought back to normal by any known regeneration or reactivation treatment. Consequently, in nearly all cases the alumina declines in efficiency more or less rapidly depending upon the conditions and must be ultimately discarded. In order to realize the longest possible practical usefulness of such alumina the art has resorted to the use of specially developed highly active aluminas, a particular example of which is the Alorco Activated Alumina Grade A.

The stability of ordinary adsorptive alumina can be increased for many conditions by the proper incorporation of minor amounts of silica. Silica, when properly incorporated into the alumina in minor amounts generally below about 15% is particularly effective in stabilizing the alumina against deterioration by the action of superheated steam.

Another class of stabilizing material comprises certain compounds of the alkali metals. These agents are particularly effective in decreasing the amount of carbonaceous deposits formed on and in the alumina during use. These, therefore, decrease the number of regeneration or reactivation treatments and also the severity of the regeneration treatments and thereby increase the useful life of the alumina. Of the alkali metals, potassium is particularly effective. The function of the alkali metal in this respect is particularly dependent upon the form in which it is present in the alumina. The reason for this is not understood. It is found, however, that alkali metal added to the alumina in the form of the hydroxide, nitrate or carbonate, is relatively ineffective and often adversely affects the activity when used in catalysis, whereas when the alkali metal is incorporated in the form of an alkali metal silicate the effectiveness is particularly marked. When incorporated in the form of an alkali metal silicate much lower concentrations of alkali metal are effective and the catalytic activity is not usually appreciably impaired.

These two types of stabilizing agents can be used in conjunction and this may be accomplished by the proper incorporation of the alkali metal silicate. However, in general, the amount of alkali metal to be used is in the order of .03 to 1% and the amount of silica, introduced by this method, is generally below the optimum amount desired. It is therefore generally necessary to incorporate additional amounts of silica.

The stabilizers may be incorporated with the alumina in a number of ways. A particular suitable method of incorporating the stabilizing agents depends upon the interaction or replacement of sulfate from basic aluminum sulfate.

When alumina is precipitated in the presence of sulfate ions, as for example when employing aluminum sulfate or an alum or when employing an acid sulfate as the precipitating agent, it is necessary to effect the precipitation at a pH above about 10 in order to prevent the formation of detrimental quantities of basic aluminum sulfate. (The pH conditions therein referred to all relate to the pH of the reaction mixture at the completion of the precipitation reaction.) At pH conditions below about 10 considerable quantities of basic aluminum sulfate form and the concentration of basic sulfate increases as the pH is reduced. Thus, Figure I of the attached graph shows the concentration of aluminum basic sulfate in alumina produced by precipitation from a 1 N solution aluminate with 1 N sulfuric acid at room temperature.

In the usual preparation of alumina from aluminum sulfate or an alum or with an acid sulfate such as sulfuric acid, ammonium sulfate, or the like, the formation of basic aluminum sulfate is carefully avoided. In such cases where any appreciable amount of basic sulfate is present it is removed by digesting the precipitate with concentrated ammonium hydroxide or by other secondary treatment. According to the process of the present invention, however, the precipitation is carried out in the presence of sulfate ions under pH conditions purposely chosen to give a minor predetermined amount of basic aluminum sulfate. This basic sulfate, it is found, may be removed substantially quantitatively by reaction with an alkali metal silicate in which case substantially the stoichiometric quantity of silica replaces the sulfate of the basic aluminum sulfate. Thus, by controlling the amount of basic sulfate formed by control of the precipitation conditions, and subsequently incorporating an alkali metal silicate, any desired and controlled amount of silica may be intimately incorporated. If the alkali metal silicate is incorporated in the absence of the basic aluminum sulfate, the alkali metal is difficult to remove. However, when these materials are incorporated in the presence of the basic aluminum sulfate, the alkali metal forms the stoichiometric quantity of alkali metal sulfate which is easily washed out.

The catalytic activity of stabilized alumina prepared in the described manner is unexpectedly superior to alumina having the same analysis prepared by incorporating the silica by other methods, such, for example, as by forming a co-precipitated gel of alumina and silica having the same composition. The reason of this superiority is at present not understood. It is, however, real as is evident from the comparative examples below.

Suitable stabilized alumina may be prepared according to the described method starting with an alum or with aluminum sulfate such as obtained, for example, in the treatment of clays with sulfuric acid and precipitating with any of the usual alkalis such as sodium hydroxide, ammonium hydroxide, or the like. Also the alumina may be very advantageously, and perhaps more economically, produced from alkali aluminate solutions such as the sodium aluminate solutions obtained in the production of alumina from bauxite. Certain of these solutions, particularly if obtained by the treatment of high-silica bauxites with strong caustic and/or under severe conditions, may contain minor amounts of silica and/or titania. This, however, does no harm. These various alkali metal aluminate solutions are reacted with any acid sulfate such as sulfuric acid, ammonium sulfate, or the like. A mixture of sulfuric acid and ammonium sulfate is a very suitable precipitating agent. The aluminas produced from these various alkali metal aluminate solutions and an acid sulfate, very surprisingly, do not contain any appreciable amount of firmly bound alkali metal. Thus, the alkali metal may be substantially completely washed out by a simple washing treatment. This is of particular importance, as will be apparent in the following description, since it allows relatively inexpensive sodium aluminate solutions to be applied while at the same time affording a product in which all of the alkali metal present is potassium.

The precipitation, as pointed out above, is carried out at a pH (for instance below about 9.8), adjusted to give the desired concentration of basic aluminum sulfate. The precipitation may be carried out batchwise or continuously at room temperature or at elevated temperature and under any desired pressure. These conditions may be adjusted and controlled in the known manner to control to a certain extent the density of the product. In general there is a drop in density upon the subsequent reaction to replace the sulfate. If a final product of particular density is desired, it is therefore advisable to attempt to produce a product of somewhat higher density in the precipitation step. The precipitation does not need to be carried out slowly, but may be carried out very rapidly. In general it is desired to produce a product having the highest possible mechanical strength. When this is the case it is preferable that the solutions employed be not too concentrated, for instance, below 4 normal. Also, when precipitating the alumina from an alkali aluminate solution with $H_2SO_4$ it is found that adding the acid to the sodium aluminate solution produces a hard strong material, whereas adding the sodium aluminate solution to the acid produces a softer more friable material.

The alumina containing a certain amount of basic aluminum sulfate and precipitated as described, may be washed to remove alkali metal sulfate and if desired, it may be aged and/or dried, prior to incorporating the silica or other stabilizers. However, neither of these steps are essential at this point in the preparation.

The alkali metal silicate may be obtained from any source or may be prepared by dissolving the oxide in sufficient alkali metal hydroxide to form a suitable solution. The solution may be conveniently incorporated into the alumina and reacted with the basic aluminum sulfate by simply mixing or by impregnating the hydrous alumina gel. The displacement takes place very rapidly and substantially quantitatively. The amount of silica incorporated is generally less than 15% and generally at above 1%, based on the alumina. Very suitable concentrations are, in general, between about 3 and 10%.

As pointed out above, it is often desired that the final product also contain a small amount of an alkali metal stabilizer—usually between about 0.03 and 1%. In order to incorporate this in its most effective form, it is merely necessary to add a small excess of the alkali metal silicate equivalent to the desired concentration of alkali metal. Potassium is somewhat superior to sodium for some applications and is a preferred alkali metal. The alkali metal sulfate formed by the replacement, as well as alkali metal sulfate remaining from the original precipitation, may be washed from the product with water without appreciable removal of the sodium or potassium incorporated in the form of excess sodium or potassium silicate. Even when the alkali is washed out to below 0.03%, catalysts producing small amounts of carbon result, due apparently to the influence of alkali metal on gel mixture during the course of the preparation. Thus, by the described method it is possible to prepare stabilized aluminas having superior catalytic activity in a very convenient and economical manner.

The aluminas produced as described may be used for the dehydration of liquids and gases, for the decolorizing, refining, etc. of oils, syrups, glycerine, etc., as well as catalysts and as carriers in multicomponent catalysts. They are particularly advantageous however, for use in such cases where the alumina is subjected to conditions which are ordinarily considered detrimental. Thus, for example, they are particularly suited in combination with boric oxide for use in the catalytic conversion of hydrocarbon oils, for instance cracking.

*Example*

An alumina gel was prepared by rapidly precipitating a 1-normal sodium aluminate solution with 1-normal sulfuric acid at a pH of 9.1. This condition was chosen to produce an amount of basic aluminum sulfate equivalent to about 4–5% of silica. The gelatinous precipitate, after standing for 1 hour at room temperature, was filtered and washed with distilled water until the washings tested free of sulfate ions. Washed gels produced in this manner contain less than 0.02% sodium. The washed gel was then slurried with a solution of a commercial potassium silicate (Philadelphia Quartz Company N Brand), to which has been added sufficient potassium hydroxide to increase the ratio of potassium to silica to that of the meta-silicate. The amount of silicate added was calculated to be stoichiometrically equivalent to the amount of basic aluminum sulfate produced at a pH of 9.1. The slurry was filtered, washed with distilled water until the washings tested free of sulfate ions, dried, and finally calcined for 3 hours at 500° C. The stabilized alumina base was then impregnated with a concentrated solution of boric acid at the boiling point, dried, and calcined for 3 hours at 500° C. The resulting catalyst contained 23% $B_2O_3$, 4.11% $SiO_2$, 0.44% $SO_4$, a trace of potassium, and no sodium. The bulk density of the gel base (8–14 mesh) was 0.54 and that of the catalyst was 0.68.

This catalyst was used for the catalytic cracking of a West Texas gas oil under the following conditions:

| | |
|---|---|
| Liquid hourly space velocity | 4.0 |
| Temperature | 500° C. |
| Process period | 60 minutes |
| Pressure | Substantially atmospheric |

The depth of cracking was 51.3% and the amount of carbon formed was 3.1%. The cracking/carbon ratio was therefore 16.5.

The results of the above example are to be compared with the results obtained with a catalyst of substantially the same composition prepared as follows:

A quantity of potassium silicate (Philadelphia Quartz Company N Brand) equivalent to 5% silica was mixed with a 1-normal solution of sodium aluminate, and the mixture was rapidly coprecipitated with 1-normal sulfuric acid at a pH of 10.05. The gelatinous precipitate was filtered, washed with distilled water until the washings tested free of sulfate ions, dried, and calcined for 3 hours at 500° C. Gels prepared in the described manner contain substantially no sodium or potassium and very little basic aluminum sulfate. The base material was then impregnated with boric acid as described above. The final catalyst contained about 22% $B_2O_3$. The bulk density of the base gel was 0.69 and that of the final catalyst was 0.77.

This catalyst was used for the catalytic cracking of the same West Texas gas oil under the same conditions. The depth of cracking was 47.2% and the amount of carbon formed was 4%. Thus, the cracking/carbon ratio was 11.8.

The depth of cracking is defined as 100 minus the per cent by weight of the feed recovered as a liquid boiling above 400° F. The cracking/coke ratio is defined as the depth of cracking divided by the per cent by weight of carbon, based on the feed, which is burned from the catalyst during the generation.

We claim as our invention:

1. Method for the preparation of stabilized alumina suitable for use in catalysis which comprises the steps of precipitating aluminum hydroxide from an aqueous solution of an alkali metal aluminate by means of an acid sulfate at a pH below about 9.8 adjusted to give a predetermined minor concentration of basic aluminum sulfate, incorporating an amount of an alkali metal silicate at least stoichiometrically equivalent to said basic aluminum sulfate, and removing alkali metal sulfate.

2. Method for the preparation of stabilized alumina suitable for use in catalysis which comprises the steps of precipitating aluminum hydroxide from an aqueous solution of an alkali metal aluminate by means of sulfuric acid at a pH below about 9.8 adjusted to give a predetermined minor concentration of basic aluminum sulfate, incorporating an amount of an alkali metal silicate at least stoichiometrically equivalent to said basic aluminum sulfate, and removing alkali metal sulfate.

3. Method for the preparation of stabilized alumina suitable for use in catalysis which comprises the steps of precipitating aluminum hydroxide from an aqueous solution of an alkali metal aluminate by means of ammonium sulfate at a pH below about 9.8 adjusted to give a predetermined minor concentration of basic aluminum sulfate, incorporating an amount of an alkali metal silicate at least stoichiometrically equivalent to said basic aluminum sulfate, and removing alkali metal sulfate.

4. Method for the preparation of stabilized alumina suitable for use in catalysis which comprises the steps of precipitating aluminum hydroxide from an aqueous solution of an alkali metal aluminate by means of a mixture of sulfuric acid and ammonium sulfate at a pH below about 9.8 adjusted to give a predetermined minor concentration of basic aluminum sulfate, incorporating an amount of an alkali metal silicate at least stoichiometrically equivalent to said basic aluminum sulfate, and removing alkali metal sulfate.

5. Method for the preparation of stabilized alumina suitable for use in catalysis which comprises the steps of precipitating aluminum hydrox drox from an aqueous solution of sodium aluminate by means of an acid sulfate at a pH below about 9.8 adjusted to give a predetermined minor concentration of basic aluminum sulfate, incorporating an amount of an alkali metal silicate at least stoichiometrically equivalent to said basic aluminum sulfate and removing alkali metal sulfate.

6. Method for the preparation of stabilized alumina suitable for use in catalysis which comprises the steps of precipitating aluminum hydroxide from an aqueous solution of an alkali metal aluminate by means of an acid sulfate at a pH below about 9.8 adjusted to give a predetermined minor concentration of basic aluminum sulfate, incorporating an amount of potassium silicate at least stoichiometrically equivalent to said basic aluminum sulfate, and removing alkali metal sulfate.

7. Method for the preparation of stabilized alumina suitable for use in catalysis which comprises the steps of precipitating aluminum hydroxide from an aqueous solution of an alkali metal aluminate by means of an acid sulfate at a pH below about 9.8 adjusted to give a predetermined minor concentration of basic aluminum sulfate, incorporating an amount of sodium silicate at least stoichiometrically equivalent to said basic aluminum sulfate, and removing alkali metal sulfate.

8. Method for the preparation of stabilized alumina suitable for use in catalysis which comprises the steps of precipitating aluminum hydroxide from an aqueous solution of an alkali metal aluminate by means of an acid sulfate at a pH below about 9.8 adjusted to give a predetermined minor concentration of basic aluminum sulfate, incorporating an amount of an alkali metal silicate which is in excess of the stoichiometric equivalent of said basic aluminum sulfate by an amount equivalent to from about 0.03 to 1% alkali metal based on the alumina, and removing alkali metal sulfate.

9. Method for the preparation of stabilized alumina suitable for use in catalysis which comprises the steps of precipitating aluminum hydroxide from an aqueous solution of an alkali metal aluminate by means of an acid sulfate at a pH below about 9.8 adjusted to give a predetermined minor concentration of basic aluminum sulfate, incorporating an amount of an alkali metal silicate which is stoichiometrically equivalent to said basic aluminum sulfate and equivalent to about 1 to 15% $SiO_2$ and removing an alkali metal sulfate.

10. Method for the preparation of stabilized alumina suitable for use in catalysis which comprises the steps of precipitating an alumina gel containing a minor amount of basic aluminum sulfate, reacting said gel with an aqueous solution of an alkali metal silicate to replace the sulfate in said basic aluminum sulfate substantially completely with silica, and washing to removing alkali metal sulfate.

11. Method according to claim 1 in which the precipitation of the alumina is effected from solutions of concentrations less than 4 normal.

12. Method according to claim 1 in which the acid sulfate is added to the alkali metal aluminate solution.

13. An adsorptive aluminous material suitable for use in catalysis consisting essentially of an essentially homogeneous composition of an alumina gel, a minor amount between about 1% and 15% of silica, and a still lesser amount between about 0.03% and 1% of an alkali metal, said alkali metal being introduced in the form of an alkali metal silicate and said silica being introduced predominantly by replacement of sulfate of basic aluminum sulfate in the original alumina gel.

14. An adsorptive aluminous material suitable for use in catalysis consisting essentially of an essentially homogeneous composition of an alumina gel, a minor amount between about 1% and 15% of silica and a still lesser amount between about 0.03% and 1% of potassium, said potassium being introduced in the form of a potassium silicate and said silica being introduced predominantly by replacement of sulfate of basic aluminum sulfate in the original alumina gel.

WILLIAM A. BAILEY, Jr.
CLARENCE W. BITTNER.